United States Patent
Wang et al.

(10) Patent No.: US 7,961,916 B2
(45) Date of Patent: Jun. 14, 2011

(54) USER IDENTIFICATION METHOD

(75) Inventors: Jen-Li Wang, Taipei (TW); Chien-Ming Lee, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1042 days.

(21) Appl. No.: 11/806,789

(22) Filed: Jun. 4, 2007

(65) Prior Publication Data

US 2008/0049985 A1 Feb. 28, 2008

(30) Foreign Application Priority Data

Aug. 25, 2006 (TW) .............................. 95131460 A

(51) Int. Cl.
*G06K 9/00* (2006.01)
(52) U.S. Cl. ...................................... 382/118
(58) Field of Classification Search .................. 382/118
See application file for complete search history.

(56) References Cited

U.S. PATENT DOCUMENTS

| | | | | |
|---|---|---|---|---|
| 5,561,718 A | * | 10/1996 | Trew et al. | 382/118 |
| 6,963,659 B2 | * | 11/2005 | Tumey et al. | 382/116 |
| 7,089,185 B2 | * | 8/2006 | Nefian | 704/256 |
| 2002/0171546 A1 | * | 11/2002 | Evans et al. | 340/540 |
| 2004/0071338 A1 | * | 4/2004 | Nefian | 382/159 |
| 2005/0021340 A1 | * | 1/2005 | Steinbiss | 704/273 |
| 2005/0047664 A1 | * | 3/2005 | Nefian et al. | 382/228 |
| 2005/0094849 A1 | * | 5/2005 | Sung et al. | 382/103 |
| 2005/0182962 A1 | * | 8/2005 | Given et al. | 713/200 |
| 2006/0107312 A1 | * | 5/2006 | Fiske | 726/5 |

FOREIGN PATENT DOCUMENTS

JP 2005092639 A * 4/2005

* cited by examiner

*Primary Examiner* — Wenpeng Chen
(74) *Attorney, Agent, or Firm* — Muncy, Geissler, Olds & Lowe, PLLC

(57) ABSTRACT

The present invention provides an identification method. A video capture device captures an identification video at a random time. Then a suitable identification image is obtained from the identification video. Subsequently, a current user characteristic value obtained from the identification image is compared with a stored user characteristic value of a user data stored in a recognition database. When the current user characteristic value corresponds to the stored user characteristic value, then returns to capture the identification video step. When the current user characteristic value does not corresponds to the stored user characteristic value, then an error counter is incremented, and returns to the acquiring the identification video step.

15 Claims, 5 Drawing Sheets

USER IDENTIFICATION METHOD

RELATED APPLICATION

This application claims priority to Taiwan Application Serial Number 95131460, filed Aug. 25, 2006, which is herein incorporated by reference.

BACKGROUND

1. Field of Invention

The present invention relates to an identification method. More particularly, the present invention relates to a continuous computer user identification method.

2. Description of Related Art

Information security is an important subject in computer development. Right now, most business data is collected, processed and stored on electronic computers and transmitted across networks to other computers. If the security protecting confidential information about business customers or finances is breach there could be business losses, or even bankruptcy. Therefore, the field of information security has grown and evolved in recent years.

The common protection methods are password, fingerprint, facial, and iris. In addition to password protection, other methods are judge a lawful user based on body features of a user. The accuracy and convenience of using body feature identification as a security tool has grown with technological improvements. Confidential information can therefore be better protected with these methods.

However, these protection methods are passive. The user must put the body feature such as a finger, face or iris near the sensor. The sensor then detects the body feature and analyses the feature information to determine whether the user is a lawful user or not. When the user is a lawful user, the protection system allows the user to log into the operating system or open a specific file.

Unfortunately, if the user leaves the computer after logging into the operating system and does not perform protective actions, such as logging out the operating system or closing a specific file, secure data stored on the computer is at risk. Anyone can control this computer or review the specific file. Hence, there is still room to improve information security.

SUMMARY

The current embodiment describes a user identification method comprising logging into an operating system, acquiring an identification video after a random time, obtaining a suitable identification image from the identification video. Subsequently, processing the identification image to get current user characteristic values, and comparing the current characteristic values with the stored user characteristic values of a user data stored in a recognition database. Finally, returning to the acquiring the identification video step when the current user characteristic value corresponds to the stored user characteristic value; or incrementing an error counter, and returning to acquire the identification video step when the current user characteristic value not corresponding to the stored user characteristic value.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
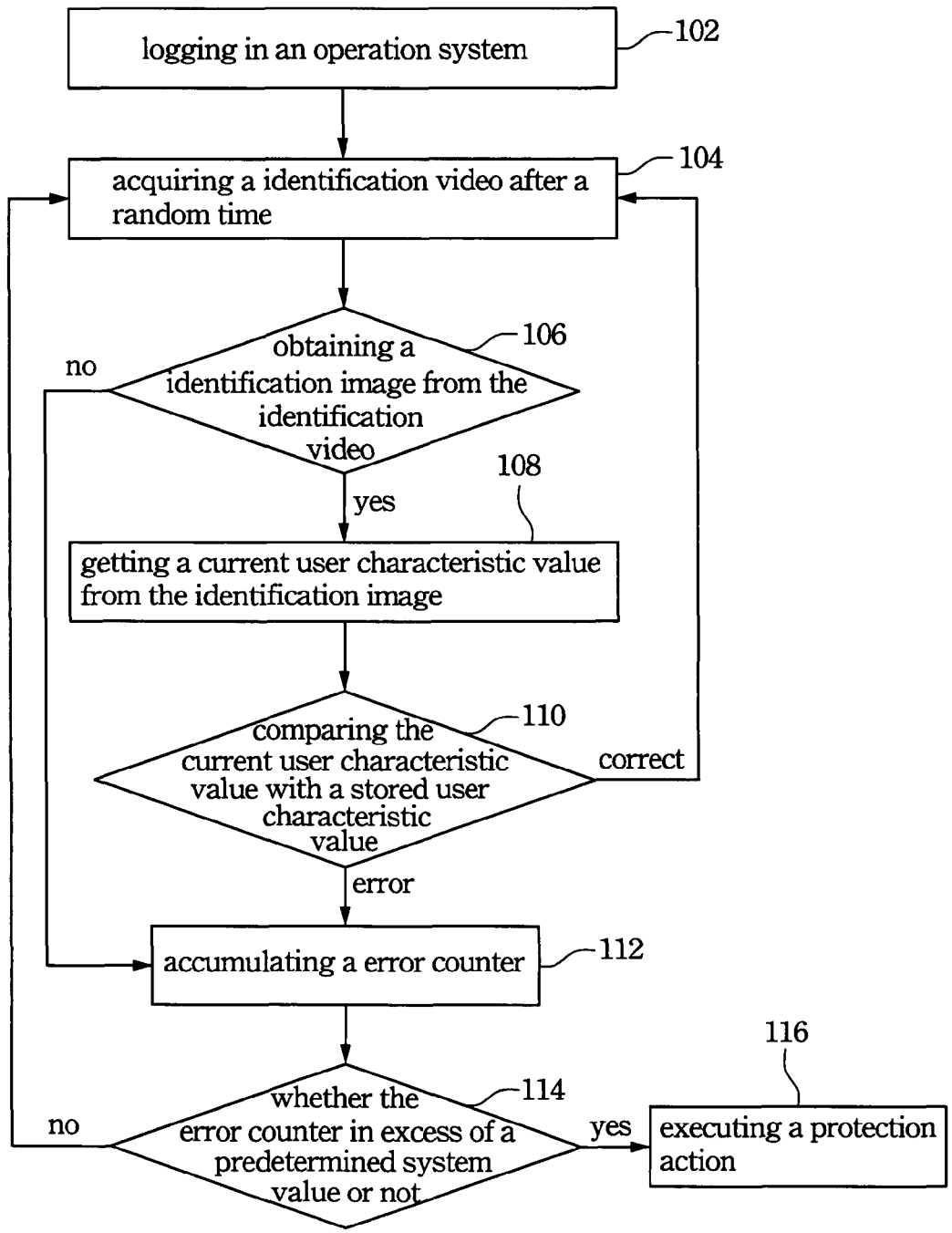
FIG. 1 depicts a flow chart of the first embodiment of the user identification method.

Reference will now be made in detail to the present embodiments of the invention, examples of which are illustrated in the accompanying drawings. Wherever possible, the same reference numbers are used in the drawings and the description to refer to the same or like parts.

Almost all computers have video capture devices for video chat IM (Instant Messaging) functions. Moreover, human facial recognition has improved with technology in recent years. The present invention of the embodiments combines a video capture device and human facial recognition to actively and continuously capture the current user image to detect whether the current user is a lawful user or not. If the current user is not a lawful user, the computer initiates protective steps to prevent a breach of security. Someone skilled in the art could vary the application for other situations, and adjust the parameters, comparative and analysis method for a variety of designs.

First Embodiment

Please refer to FIG. 1. FIG. 1 depicts a flow chart of the first embodiment of the user identification method. In step 102, a user logs into an operating system. In step 104, the operating system acquires an identification video with a is video capture device after a random time. In step 106, the operating system obtains a suitable identification image from the identification video. In step 108, after the identification image is found, the operating system processes the identification image to get the current user characteristic values. Subsequently, the characteristic values are compared with a stored user characteristic value of the user data stored in a recognition database to identify the current user. When the current user characteristic value corresponds to the stored user characteristic value, the method returns to step 104. When the current user characteristic value does not correspond to the stored user characteristic value, the operating system accumulates an error counter, and the method returns to step 104.

The steps described above are the user identification method of the first embodiment of the invention. Through these steps, the computer actively and continuous identifies the user. Moreover, due to information security, when step 106 cannot obtain a suitable identification image from the identification video, an error counter is incremented and returns to step 104.

Furthermore, the operating system further comprises a predetermined system value to be a basis of a judgment. The error counter will be continuously incremented when the operating system cannot obtain the suitable identification image and fails to compare the current user characteristic values with the stored user characteristic values. In step 114, when the error counter is in excess of a predetermined system value, the method will go to step 116, the operating system executes protective action to prevent the risk of a security breach. In step 114, when the error counter is lower than the predetermined system value, the method goes to step 104 to the identification steps. Moreover, when the error counter is not at the initial value, then the operating system judges the current user is a lawful user, the error counter is changed to the initial value to prevent protective action from being triggered by excessive misjudgments of the operating system. On the other hand, the error counter will be reset to an initial value when the comparison of the characteristic value is correct at an instant while the comparison of the characteristic value is not continuously incorrect.

In this embodiment, the random time is randomly generated by a timer. Protective actions include logging out of the operating system, executing screensaver software, or locking a predetermined folder or file.

Figure 2:
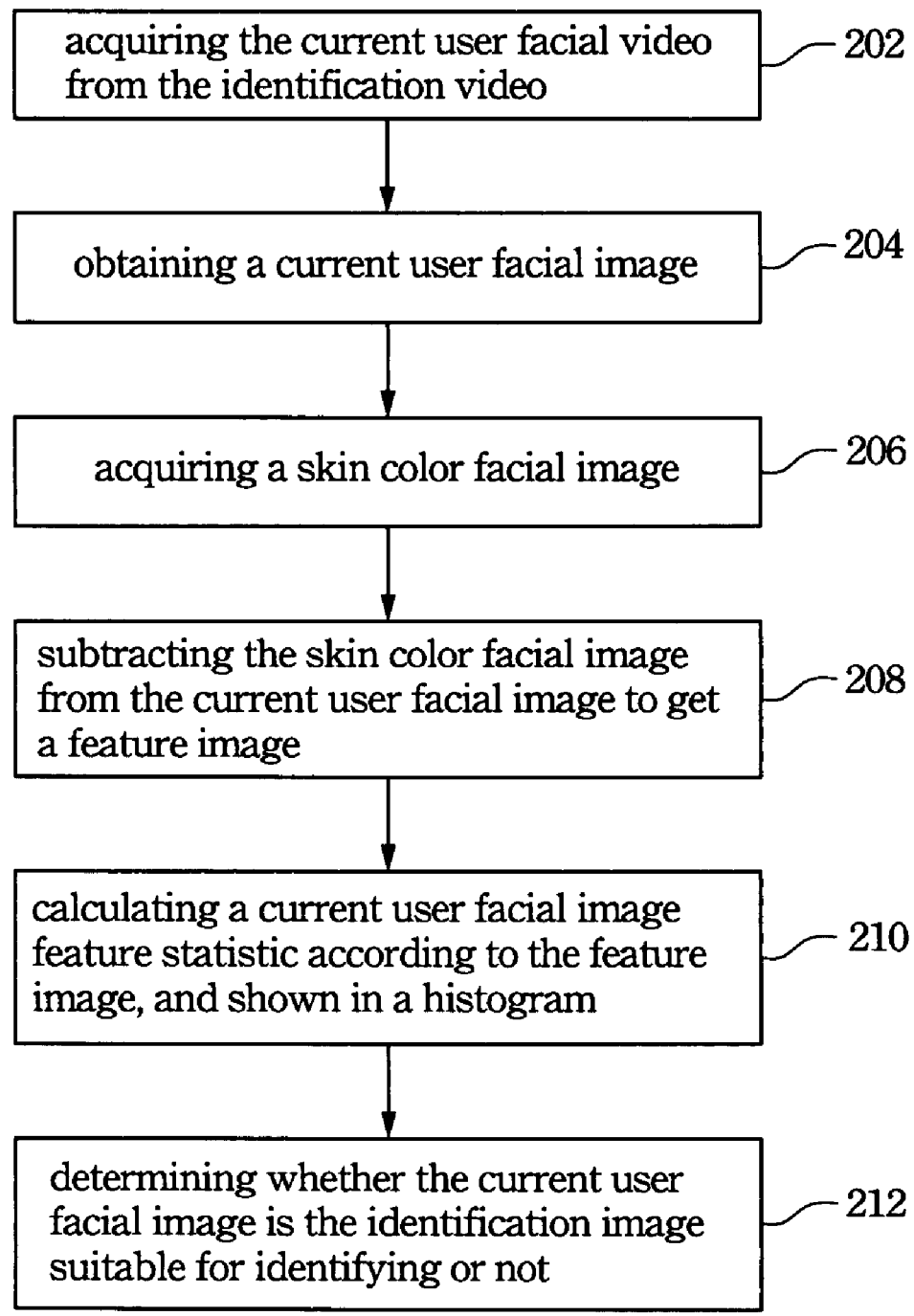
FIG. 2 depicts a flow chart for obtaining the identification image.

Please refer to FIG. 1 and FIG. 2 together. FIG. 2 depicts a flow chart showing how a suitable identification image is captured, the substeps of step 106. The present invention of the embodiments combines the video capture device and human facial recognition to automatically and continuously identify the current user. Therefore the identification video acquired in step 104 must comprise a current user facial video. When the identification video does not comprise the current user facial video, the operating system cannot obtain the identification image, the method then goes to step 112, increments the error counter, and returns to step 104, and acquires an identification video after the random time.

When the identification video comprises the current user facial video, operating system can obtain a suitable identification image and identify the current user. In general, the suitable identification image is a front facial image. A turned facial image could result in misjudgments because there are less facial features. Therefore, the operating system obtains the front facial image as the suitable identification image from the identification video. FIG. 2 depicts a method for obtaining the front facial image in this embodiment.

In step 202, the current user facial video is acquired from the identification video. In step 204, to obtain the current user's facial image, the maximum skin tone zone from every image of the current user facial video is obtained through skin tone determination and the elimination of the background. Then in step 206, morphology erases the features from the current user's facial image to acquire the skin color facial image of the current user's facial image. In step 208, the skin color facial image is subtracted from the current user facial image to obtain a feature image of the current user facial image, such as eyebrows, eyes and lips. Subsequently, in step 210, the current user's facial image feature statistic is calculated from the vertical and horizontal direction according to the feature image, and shown in a histogram. Finally, in step 212, the operating system determines whether the facial features of the current user facial image (feature image) agree with the front facial feature or not according to a histogram. The front facial features are such as parameters of symmetry or inclined angle. If the facial features of the current user facial image are agreed with the front facial features, the current user facial image is the suitable identification image.

In step 212, if all current user facial images cannot be identified as the identification image, the method increments the error counter and returns to step 104 to continue the identification actions. In this situation, the current user facial images are obtained from the identification video; however, all current user facial images are not the front facial images. Therefore, the current user may not pay attention to the information on the screen. Hence, the method judges this situation as an unlawful user situation and increments the error counter.

Figure 3:
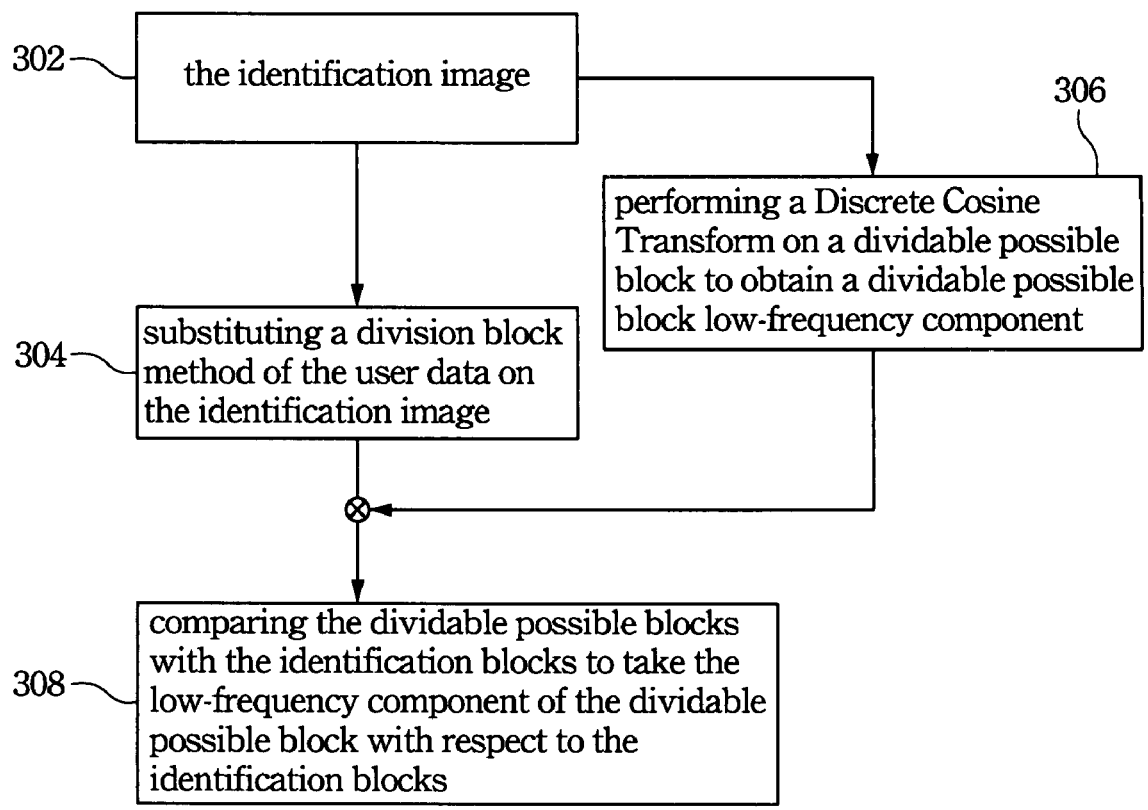
FIG. 3 depicts a flow chart of a method to get the current user characteristic value.

Please refer to FIG. 1 and FIG. 3 together. FIG. 3 is a flow chart of a method to get the current user characteristic value. After the suitable identification images are obtained, the suitable identification images are processed in step 108; and are then compared. A number of facial recognition algorithms are available. In this embodiment, the Viterbi algorithm is used to obtain a best dividing method for the user data and the process of processing the identification image. Moreover, a Discrete Cosine Transform is performed on each divided block to obtain a low-frequency component as the characteristic value. The dividing method and the characteristic value are the user data and the comparison tool.

In step 302, the identification image is obtained. Subsequently, go to step 304 and step 306. In step 306, the Discrete Cosine Transform is performed on all possible divided blocks from the identification image to obtain a possible divided block low-frequency component, wherein each possible divided blocks are different because that they go through different dividing methods. The Viterbi algorithm is used to help choosing the best dividing method. Step 304 is used to substitute the division block method for finding out the best division block method according to the Viterbi algorithm. In an embodiment, step 304 is performed for applying a re-division method to the to be recorded user facial image to obtain at least one re-divided block based on performing a Viterbi algorithm on the characteristic block low-frequency component, so as to renew the identification image. Then the Discrete Cosine Transform is performed on the re-divided block to obtain a re-divided block low-frequency component. If the re-division method is figured out not the best division method, then Step 304 can be performed again for applying another re-division method to the to be recorded user facial image. Due to the dividing method obtained from the Viterbi algorithm having specific sequences, moving the block toward the lower right produces more blocks, thus obtaining all divided blocks from the Viterbi algorithm. In step 304, all dividing methods of the user data are applied on the identification image to obtain the identification blocks. Then, in step 308, the possible divided blocks are compared with identification blocks by the same position and area of the identification block. The comparison takes the low-frequency component of the possible divided block as the current user characteristic value.

The reason for not directly substituting all dividing method s of the user data stored in the recognition database on the identification image to get divided blocks, and obtaining every divided block low-frequency component to compare with the low-frequency component of the possible divided block is that if there are too many user data stored in the recognition database, then the occurrence of blocks overlapping is inevitable. Hence, repeat calculations may occur during the Discrete Cosine Transform. This embodiment initially determines the low frequency components of a possible divided block, then the dividing method s of the user data are applied to the identification image. Subsequently, the current user characteristic value is obtained through the blocks comparison. Finally compares the current user characteristic values with the stored user characteristic values of the user data to identify the current user. Therefore, repeated calculations are reduced and processing efficiency improved.

Figure 4:
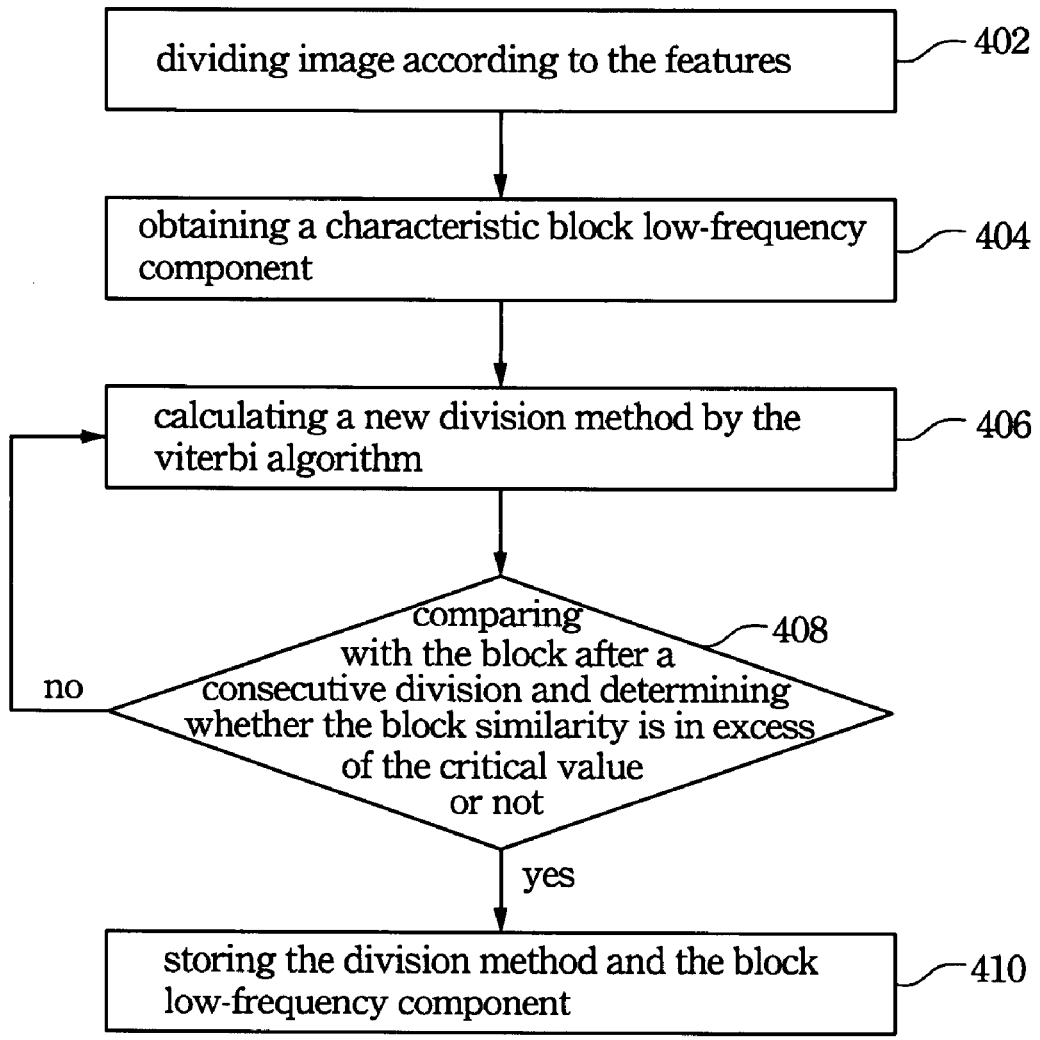
FIG. 4 depicts a flow chart of a method to obtain the user data.

Refer to FIG. 4. FIG. 4 is a flowchart outlining the methods used to obtain user data. In step 402 the image of a to be record user image is divided according to the facial features of the user to obtain at least one characteristic block. Features may include the eyes, nose, mouth and any other part of the face. In step 404, a Discrete Cosine Transformation is performed on the characteristic block to generate low frequency components. In step 406, a Viterbi algorithm is performed on the characteristic block low-frequency component. A first re-division method of the image is then determined. The first re-dividing method is used to divide the user facial image to obtain at least one first re-divided block. The Discrete Cosine Transform is performed on the first re-divided block to obtain the low-frequency components of the first re-divided block. Subsequently, a second re-dividing method of the image is determined by performing a Viterbi algorithm on at least one re-divided block. The second re-dividing method is used to divide the user facial image to obtain at least one second re-divided block. The Discrete Cosine Transform is performed on the second re-divided block to obtain a second re-divided block low-frequency component.

In step 408, the second re-divided block is compared with the first re-divided block to determine the block similarity. When the block is in excess of a critical value, then method goes to step 410. The second re-dividing method and the second re-dived block low-frequency component are stored as user data. When the block similarity is lower than the critical value, then step 406 is repeated, this requires repeating the Viterbi algorithm and comparing with the block after a consecutive division until the block after the consecutive division similarity in excess of the critical value, and storing the last re-dividing method and the last re-divided block low-frequency component as the user data.

Accordingly, the embodiment can continually identify the current user, after logging into the operating system, and prevent unlawful users reviewing the information stored in the computer.

Second Embodiment

The most common method for logging into an operating system is with a password. The first embodiment describes the automatic acquisition of the identification video to identify the user. Therefore, the identification method can be combined with the logging in method and the first embodiment; then the computer could have more security protection during the time from when the user logs in to the time of the user uses the computer.

Figure 5:
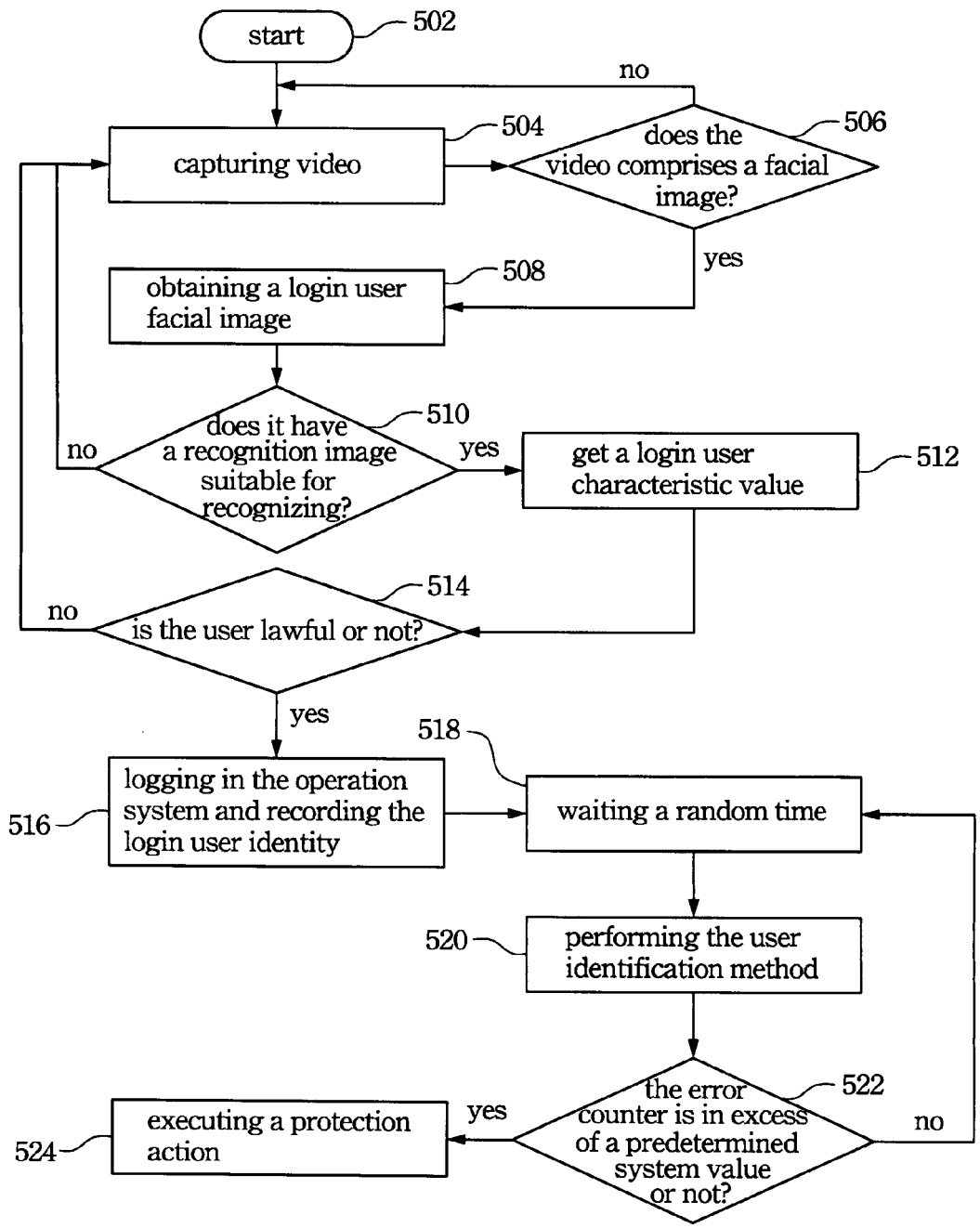
FIG. 5 depicts a flow chart of second embodiment of the identification method.

Please refer to FIG. 5. FIG. 5 depicts a flow chart of second embodiment of the identification method. In step 502, the process is started. In step 504 the computer video capture device captures the recognition video. In step 506, the computer determines whether the recognition video comprises a login user facial video or not. When the recognition video comprises the login user facial video, the method goes to step 508. When the recognition video does not comprise the login user facial video, the method goes to step 504. In step 508, the computer obtains the login user facial video. In step 510, the computer analyses the login user facial video to determine whether the login user facial video comprises a recognition image or not. In step 512, the computer processes the recognition image to get a login user characteristic value.

In step 514, the login user characteristic value is compared with the stored user characteristic value of the user data stored in the recognition database. When the login user characteristic value corresponds to the stored user characteristic value. The method then goes to step 516. The computer determines whether the login user is a lawful user or not, and, if the user is a lawful user, allows the login user to log into the operating system and records the login user identity. Subsequently, in step 518, the operating system waits for a random time. In step 520, the operating system performs the user continuous identification method to determine whether the current user is the login user or not. In step 522, the error counter is compared with a predetermined system value. When the error counter is lower than the predetermined system value, the method returns to step 518. When the error counter is in excess of a predetermined system value, the method goes to step 524, the operating system performs protective actions.

The continuous user identification method in step 520 is almost the same as the first embodiment. The difference between the identification method between the first embodiment and the second embodiment is that the login user identity is known. In step 502, the operating system only checks whether the current user is the login user or not. Hence, the detail of the continuous user identification method is not further described herein.

Moreover, in step 510, when the login user facial video does not comprise of a suitable recognition image, the method goes to step 504. In step 514, when the login user characteristic value not corresponding to the stored user characteristic value, the method goes to step 504.

The embodiments automatically and continuously identify the user in the period of the user using the computer to protect the information stored in the computer through the video capture device and the human facial recognition technology. Therefore, the computer data protection by passively receiving the user features to identify is changed to actively acquiring the user features to identify the user identity, so that the information is safer. Moreover, the identification method combines with the logging method, then continues checking whether the current user is the login user or not. Hence, the embodiments could reduce the risk of the data stealing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A user identification method, comprising:
   (a) logging in an operating system;
   (b) acquiring an identification video after a random time, wherein the identification video comprises a current user facial video;
   (c) obtaining a suitable identification image from the identification video;
   (d) processing the suitable identification image to get a current user characteristic value;
   (e) comparing the current user characteristic value with a stored user characteristic value of a user data stored in a recognition database;
   (f) returning to step (b) when the current user characteristic value corresponds to the stored user characteristic value; and
   (g) incrementing an error counter, and returning to step (b) when the current user characteristic value does not correspond to the stored user characteristic value;
   wherein step (c) further comprises:
   (1) acquiring the current user facial video from the identification video, and obtaining a current user facial image by determining a maximum skin tone zone from at least one image of the current user facial video through skin tone determination and deleting the background;
   (2) acquiring a skin color facial image by erasing features from the current user facial image;
   (3) obtaining a feature image of the current user facial image by subtracting the skin color facial image from the current user facial image;
   (4) calculating a current user facial image feature statistic from the vertical and horizontal direction according to the feature image, and shown in a histogram; and (5) determining whether the current user facial image is the suitable identification image or not according to the histogram.

2. The method of claim 1, wherein step (c) further comprises:
incrementing an error counter, and returning to step (b) when step (c) does not obtain the suitable identification image from the identification video.

3. The method of claim 1, wherein the current user facial image in step (1) is obtained by determining the maximum skin tone zone from every image of the current user facial video through skin tone determination and deleting the background, and the skin color facial image in step (2) is acquired by erasing features from the current user facial image through morphology.

4. The method of claim 1, wherein step (5) further comprises:
incrementing an error counter and returning to step (b) when step (5) determines the current user facial image is not the suitable identification image according to the histogram.

5. The method of claim 1, wherein step (d) further comprises:
(6) performing a Discrete Cosine Transform (DCT) on a possible divided block from the identification image to obtain a possible divided block low-frequency component;
(7) applying all dividing methods of the user data stored in the recognition database on the identification image separately to obtain identification blocks; and
(8) comparing the possible divided blocks with the identification blocks, and taking the low-frequency component of the possible divided block with the same position and area of the identification block, as the current user characteristic value.

6. The method of claim 1, wherein the user data is obtained by steps comprising:
(9) dividing a to be recorded user facial image into at least one characteristic block according to the features of the to be recorded user facial image;
(10) performing a Discrete Cosine Transform on the characteristic block to obtain a characteristic block low-frequency component;
(11) applying a first re-division method to the to be recorded user facial image to obtain at least one first re-divided block based on performing a Viterbi algorithm on the characteristic block low-frequency component, and performing the Discrete Cosine Transform on the first re-divided block to obtain a first re-divided block low-frequency component;
(12) applying a second re-dividing method to the to be recorded user facial image to obtain at least one second re-divided block based on performing the Viterbi algorithm on the first re-divided block low-frequency component, and performing the Discrete Cosine Transform on the second re-divided block to obtain a second re-divided block low-frequency component;
(13) comparing the second re-division block with the first re-division block to get a block similarity; and
(14) storing the second re-dividing method and the second re-divided block low-frequency component as the user data when the block similarity in excess of a critical value.

7. The method of claim 6, wherein step 14 further comprises:
repeating and comparing the Viterbi algorithm with the block after a consecutive division until the block after the consecutive division has a similarity in excess of the critical value, and storing the last re-dividing method and the last re-divided block low-frequency component as the user data when the block similarity is lower than the critical value.

8. The method of claim 1, wherein the random time is randomly generated by a timer.

9. The method of claim 1, wherein the operating system executes protective actions when the error counter is in excess of a predetermined system value.

10. The method of claim 9, wherein the protective action is logging out the operating system.

11. The method of claim 9, wherein the protective action is locking a predetermined folder or a file.

12. The method of claim 9, wherein the protective action is executing screensaver software.

13. The method of claim 1, wherein step (a) further comprises:
(h) acquiring a recognition video;
(i) obtaining a suitable recognition image from the recognition video;
(j) processing the suitable recognition image to get a login user characteristic value;
(k) comparing the login user characteristic value with the stored user characteristic value of the user data stored in the recognition data base; and
(l) logging into the operating system when the login user characteristic value corresponds to the stored user characteristic value.

14. The method of claim 13, wherein step (i) further comprises:
returning to step (h) when step (i) cannot obtain the suitable recognition image.

15. The method of claim 13, wherein step (l) further comprises:
returning to step (h) when the login user characteristic value does not correspond to the stored user characteristic value.

* * * * *